UNITED STATES PATENT OFFICE.

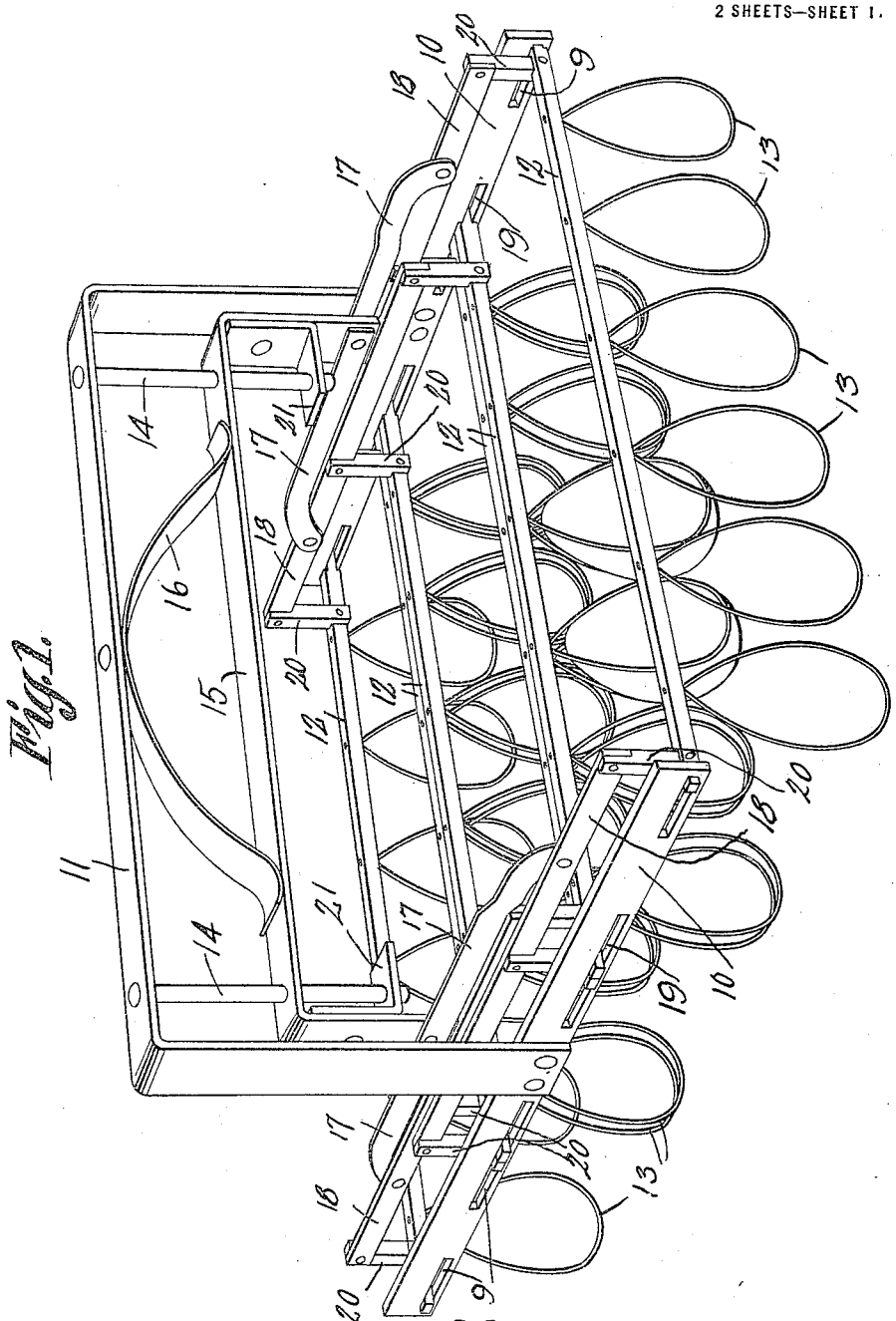

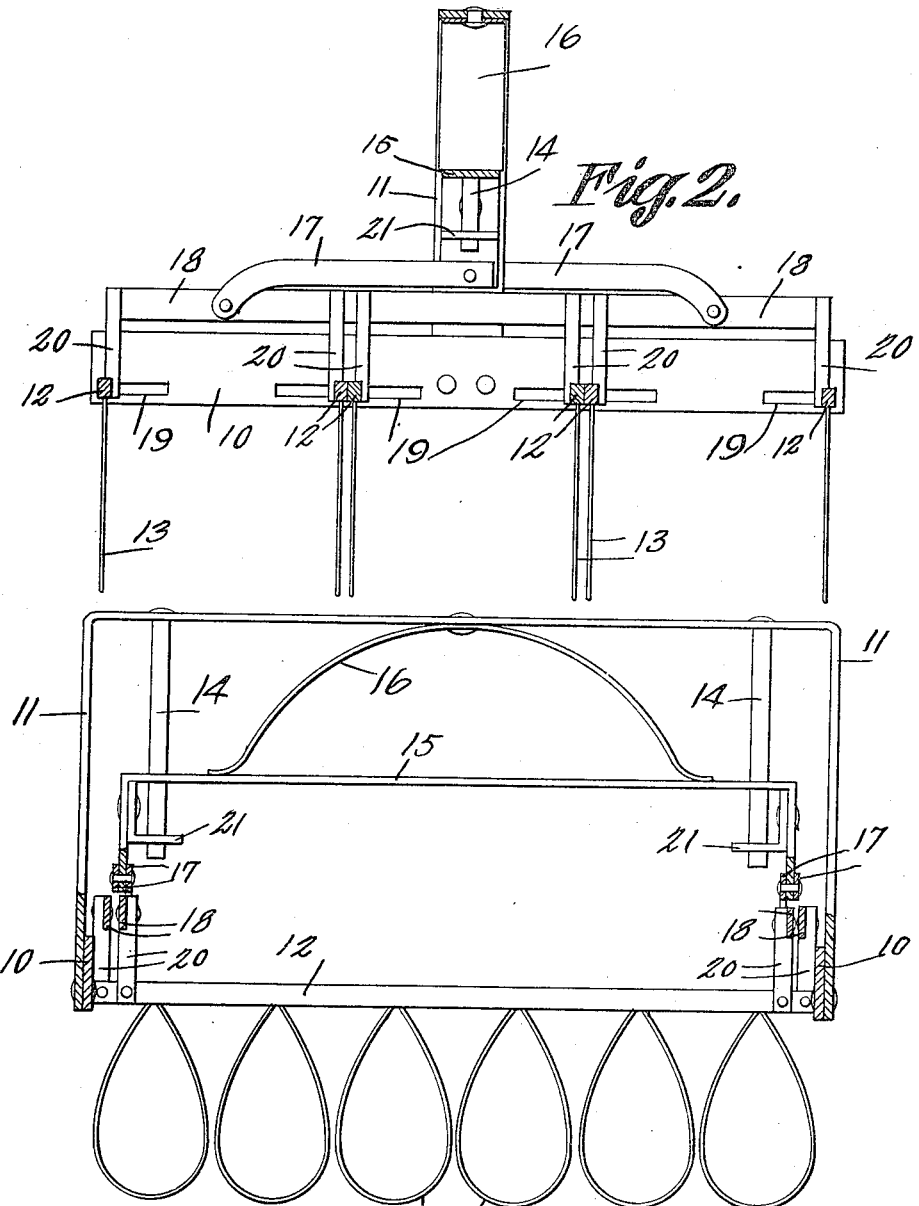

MASON O. GOBLE, OF BEATRICE, NEBRASKA.

EGG-CARRIER.

1,224,373.

Specification of Letters Patent.

Patented May 1, 1917.

Application filed June 3, 1916. Serial No. 101,539.

*To all whom it may concern:*

Be it known that I, MASON O. GOBLE, a citizen of the United States, residing at Beatrice, in the county of Gage and State of Nebraska, have invented a new and useful Egg-Carrier, of which the following is a specification.

The object of the invention is to provide an egg carrier or handler designed to be used in the candling of eggs and wherein a free and unobstructed view of all of the eggs supported therein may be had at all times, the eggs being held in the proper positions for candling with the minimum risk of injury thereto, and wherein the operation of introducing and removing the eggs is facilitated.

Further objects of the invention will appear as the description proceeds, it being understood that various changes in the form, proportions and details of construction of the illustrated embodiment of the invention may be resorted to within the scope of the claims, without departing from the spirit of the invention.

In the drawings:—

Figure 1 is a perspective view of a carrier constructed in accordance with the invention.

Fig. 2 is a sectional view transverse to the planes of the egg engaging jaws.

Fig. 3 is a sectional view in a plane at right angles to that of Fig. 2.

The apparatus embodies a main or carrier frame having parallel side bars 10 connected by a looped or bail-like member 11 constituting a handle by which the device may be transported, a series of members terminally mounted to slide upon the main or carrier frame and consisting as shown of bars 12 to which are attached the depending egg engaging jaws 13, said bars being arranged in pairs with the jaws supported respectively thereby in registration, and means for moving said slidable elements toward and from each other to provide for the introduction and removal of the eggs.

Mounted upon guide rods 14 depending from the handle 11 is an operating bar 15 yieldingly held in a depressed position by a spring 16 interposed between said handle and the bar which is connected by means of links 17 with bars 18 which repectively connect the jaw carrying bars in sets, one member of each pair of jaw carrying bars being connected with each pair of the actuating bars 18, so that when the operating element 15 is moved toward or from the plane of the handle or the grip portion of the handle, said jaw carrying bars are moved toward or from each other to close or open the spaces between the coöperating jaw members, said jaw carrying bars being terminally fitted to slide in slots 19 of the main frame bars. Obviously the number of jaw carrying elements may be varied to any desired extent by suitably proportioning the carrying frame so as to modify the capacity of the carrier.

The jaws are of looped form, the loops being substantially pear-shaped and preferably being constructed of spring wire capable of exerting a sufficiently firm pressure upon the eggs to prevent accidental displacement while adapting themselves to the contour of the eggs so that the pressure is distributed and breakage of the eggs is prevented.

In the construction illustrated, the connection between the jaw carrying bars or elements and the connecting bars 18 is effected by means of standards or posts 20 rising from the ends of the former and combining with said bars 12 and 18 to form movable frames which respectively carry complementary egg engaging and holding elements capable of simultaneous movement in opposite directions to engage or disengage the eggs, such movement being secured by the operation of the bar 15 as above noted.

In order to secure rigidity of the structure and provide for a direct and positive reciprocatory movement of the operating bar 15, it is preferably provided with brackets 21 which also have guide openings for the reception of the guide rods 14.

When the apparatus is in use, with eggs interposed between and engaged by complementary spring jaws as above described, the view downwardly through the frame in the act of candling the eggs is unobstructed both between and around the narrow jaw carrying elements, the handle and connected parts being disposed out of vertical alinement with the jaw carrying elements while the connections between said operating member and the slidable frames, are located at the extremities of the device or close to the vertical plane of the main frame bars 10.

What is claimed is:—

1. An egg candling carrier having a main frame, jaw carrying frames movably mounted upon said main frame, and means for moving said jaw carrying frames from and toward each other in pairs, the jaws consisting of yielding pear-shaped loops disposed with their reduced extremities adjacent to the carrying frames.

2. An egg candling carrier having a main frame embodying parallel side bars and a connecting bail or handle provided with a transverse grip portion, jaw carrying frames slidably mounted upon the main frame for simultaneous movement in opposite directions in pairs, the complementary elements of said frames being provided with complementary egg engaging jaws, connections between the corresponding jaw carrying frames, an operating bar slidably mounted upon the main frame for movement toward and from the grip portion of said bail or handle, links connecting the operating bar with said jaw carrying frames and an actuating spring inclosed between said operating bar and the grip portion of the bail or handle.

3. An egg candling carrier having a main frame embodying parallel side bars, and a connecting bail or handle, jaw carrying frames having bars terminally mounted in slots in the said bars of the main frame and carrying depending jaws, said jaw carrying frames also having uprights and connecting bars, guide rods depending within the handle, an operating bar terminally mounted to slide upon said guide rods, a spring interposed between said operating bar and the grip portion of the handle, and links connecting the terminals of said operating bar with said jaw carrying frames.

In testimony that I claim the foregoing as my own, I have hereto affixed my signature in the presence of two witnesses.

MASON O. GOBLE.

Witnesses:
 WALTER VASEY,
 ETHEL M. VASEY.

Copies of this patent may be obtained for five cents each, by addressing the "Commissioner of Patents, Washington, D. C."